Dec. 11, 1951   R. C. DEHMEL   2,578,177
TRAINING APPARATUS FOR SIMULATING FLIGHT INDICATING INSTRUMENTS
Filed July 20, 1950   2 SHEETS—SHEET 1

INVENTOR.
RICHARD C. DEHMEL
BY Orin R. Severn
his ATTORNEY

Dec. 11, 1951  R. C. DEHMEL  2,578,177
TRAINING APPARATUS FOR SIMULATING FLIGHT INDICATING INSTRUMENTS
Filed July 20, 1950  2 SHEETS—SHEET 2

INVENTOR.
RICHARD C. DEHMEL
BY
ATTORNEY

Patented Dec. 11, 1951

2,578,177

UNITED STATES PATENT OFFICE 2,578,177

TRAINING APPARATUS FOR SIMULATING FLIGHT INDICATING INSTRUMENTS

Richard Carl Dehmel, Short Hills, N. J.

Application July 20, 1950, Serial No. 174,874

9 Claims. (Cl. 35—12)

This invention relates to simulated flight indicating instruments for use in grounded flight training apparatus of the type having simulated aircraft controls operable by a student pilot for controlling through flight computing means the various indicating instruments; and particularly to apparatus for simulating the roll, bank and pitch indications of a currently used attitude gyro flight instrument.

Heretofore, grounded flight trainers have been provided with simulated flight instruments, including artificial horizons and attitude gyros, for simulating to varying extents the operation of the instruments as in actual flight. In general, the attitude instruments previously simulated have either become obsolete or the simulating equipment lacks sufficient flexibility and accuracy to make the flight indications realistic.

In accordance with the present invention, an attitude gyro now used in the Air Force, namely the type A-1 vertical gyro indicator, is realistically simulated so as to represent all maneuvers that an airplane would be called upon to perform.

A principal object therefore of the present invention is to provide improved simulating apparatus for attitude gyros of the character above referred to that is simple in construction, accurate and realistic in operation and capable of adequately simulating modern attitude gyro apparatus.

For a better understanding of the invention, the type A-1 vertical gyro indicator to be simulated will be briefly described. This instrument is an outgrowth of two earlier types, namely the so-called H-type which is a horizon indicator that has to be "caged" during airobatic maneuvers, and the J-type which comprises a free gyro ball and therefore does not have the disadvantage of caging. However, the indications of the J-type gyro are reversed as compared with the earlier and more familiar H-type horizon indicator so that many pilots have objected to using the J-type gyro. Accordingly, the current A-1 type was designed so as to have the general appearance and indications of the H-type horizon indicator while retaining the free gyro characteristics of the J-type attitude gyro. This new design includes a horizon bar, as in the H-type, that is operated by a free gyro ball so that in appearance at least the indications are not contrary to those of the H-type indicator.

The invention will be more fully set forth in the following description referring to the accompanying drawings, and the features of novelty will be pointed out with particularity in the claims annexed to and forming a part of this specification.

Referring to the drawings.

Figure 1:
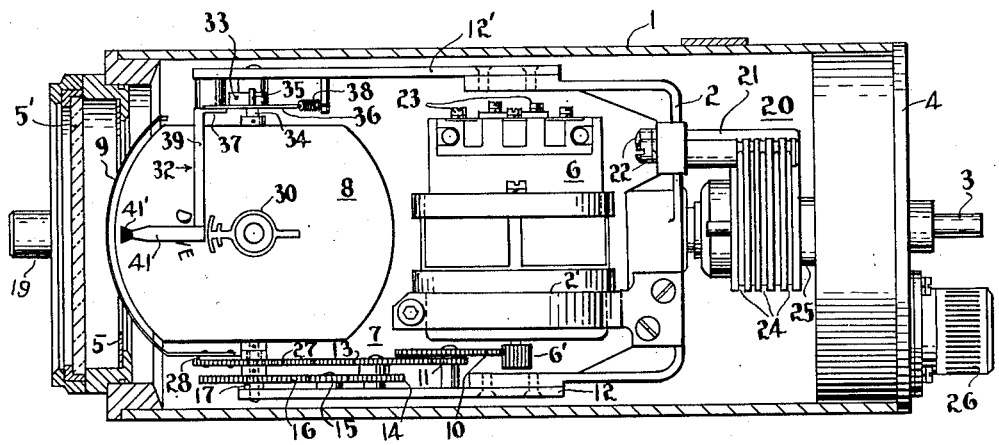
Fig. 1 is a top view, partly in section, of attitude gyro simulating apparatus embodying the present invention.

Referring to Fig. 1, the simulating apparatus comprises a cylindrical housing 1 for enclosing a rotatable yoke assembly 2 that is secured to a shaft 3 suitably journaled in an end wall 4 of the housing. The opposite end of the housing is provided with a fixed circular scale 5 and a glass or transparent window 5' for pilot observation of the indicating instrument. The yoke assembly 2 comprises an electrical receiver 6 of the self-synchronizing type that is secured to the yoke by a clamp 2' and mechanically connected through gearing generally indicated at 7 to both the "ball" 8 and the horizon bar 9. Specifically, the receiver 6 is connected to the ball through the receiver drive pinion 6', integral gears 10 and 11 which are concentrically pivoted on the yoke arm 12, integral gears 13 and 14 which are also concentrically pivoted on the yoke arm 12, idler gear 15 and gear 16 that is secured to the ball shaft 17. The ball shaft is journaled at its opposite ends in the yoke arms 12 and 12'. It will be apparent from inspection that the receiver 6 can drive the ball 8 at any desired speed ratio, the ratio in this case being unity since the receiver 6 is rotated in response to positioning of the pitch transmitter (not shown).

The electrical connections between the receiver 6 and the transmitter are not specifically shown but are clearly indicated by means of the slip-ring and brush assembly 20. The brush holder unit 21 is carried by the yoke and is provided with terminals 22 for electrical connection with corresponding terminals 23 on the receiver 6; and the slip rings 24 for the respective brushes are mounted on the stationary hub extension 25 that is secured to the end wall 4 and serves also as a supporting bearing for the yoke shaft 3. The electrical connections from the slip rings are connected to external circuits through conduit 26.

The horizon bar 9 is rotated by the receiver 6 in the present instance at a rate twice the speed of rotation of the ball 8 and in the opposite direction. To this end the gear 13 meshes directly with a gear 27 to which the horizon bar is secured at 28. The gear 27 is loosely mounted on the ball shaft so as to permit independent movement. It will be noted that the idler gear 15 which is in the gear train between the gear 13 and the ball 8 causes reversal of rotation of the ball with respect to the horizon bar.

For lining up the horizon bar in case of trim correction, a trim index member 18 mounted on a support 18' may be vertically positioned by means of a knob 19 in conventional manner. Ordinarily, the fixed horizontal markings 9' on the scale 5 are used to line up the bar 9.

Figure 3:
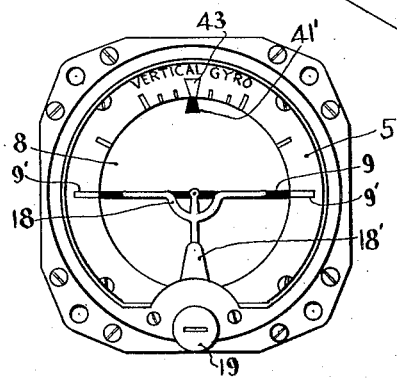
Fig. 3 is an end view of the apparatus illustrating the indicator face.
Figure 2:
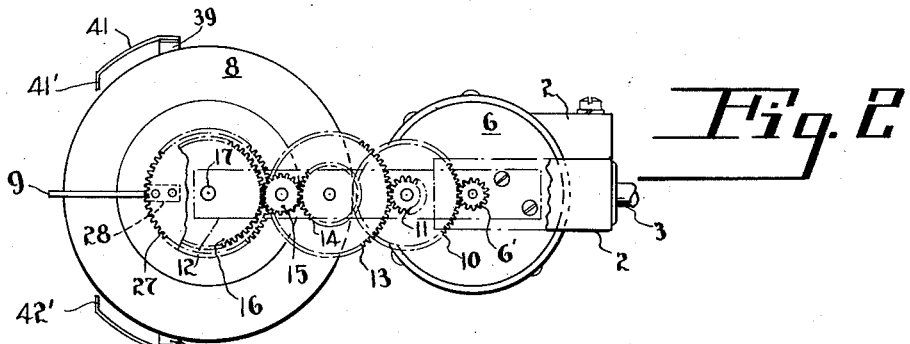
Fig. 2 is a side view of apparatus shown in Fig. 1.

In the apparatus so far described, referring now to Fig. 3, a roll attitude is indicated by a tilted position of the horizon bar with respect to the horizontal by reason of rotation of shaft 3 and hence the entire yoke assembly, by the roll servo motor (not shown), and a pitch attitude is indicated by an off-center position of the horizon bar on the indicator dial. As previously indicated, the horizon bar is positioned by the pitch receiver 6 according to the simulated pitch attitude of the trainer. For the purposes of the present invention the pitch and roll servo units of the flight training apparatus need not be shown since they are described and illustrated in detail in my copending application Serial No. 777,414 filed October 2, 1947, for "Flight Computing System and Apparatus."

In the case of complicated air maneuvers, such as rolls and loops, it is highly desirable that the pilot have before him a continuous indication of the plane's attitude, particularly in the case of inverted flight. This type of indication is simulated by means of a so-called bank index unit generally indicated at 32, Fig. 4, and operable according to rotation of the ball 8. It should be noted in this connection that in practice the ball 8 is entirely black except for two indicia 30, Fig. 4, and 31, Fig. 6-c, indicating respectively "dive" and "climb" at opposite sides of the ball 180 degrees apart.

For the purpose of determining by instrument whether the airplane is in normal or inverted flight position, the simulated bank index member 32 is mechanically related to the ball 8 so as to provide an indication at either the upper or lower part of the instrument dial according to the attitude of the simulated flight. This part of the apparatus is shown in detail in Fig. 4 wherein a cam 33 secured to the ball shaft 34 is adapted to be engaged by a pin 35 secured to the index extension arm 36 for rocking the index member 32 about its pivot 37 on the yoke arm 12'. The extension arm 36 is biased by a spring 38 attached at one end to the yoke arm 12' so as to hold the pin 35 into following engagement with the cam surface. Accordingly, as the cam 33 rotates with the ball 8, the pin 35 rides on the cam surface so as to rock the index member a limited distance in one direction for approximately 180° rotation of the ball, and in the opposite direction throughout the remaining 180° of rotation. The specific construction of the index member comprises in the present instance a pair of branch members 39 and 40 extending from the pivot 37 and having at the extremities thereof laterally extending arcuate members 41 and 42 terminating in the visual indicator portions 41' and 42' respectively. The arcuate members which are substantially concentric with the ball are spaced a short distance therefrom.

The adjustment between the ball, horizon bar and bank index is such that the bank index portion 41' shows when the attitude gyro represents normal flight up to the point where the aircraft has climbed until its nose is pointed toward the zenith. During this so-called normal indication the lower index portion 42' is out of sight at the lower part of the dial, assuming for the moment that the dial face is unobstructed by the trim index support 18'. At the point where the airplane starts to turn over on its back, the pin 35 rides to the low point of the cam 33 so that the spring 38 rocks the index portion 41' out of sight at the upper part of the dial, in which position the index portion 42' comes into view at the lower part of the dial, assuming now a small roll angle so that the view of the index portion 42' is not obstructed by the support 18'. Thus the student pilot has visual indication of positive character that he is now in inverted flight. During the maneuver the horizon bar disappears as in actual practice until the simulated flight, either normal or inverted, is leveled off sufficiently to have a horizon indication. It will be noted that the horizon bar which is rotated in opposite direction and at twice the speed of the ball 8 represents in the case of 360° rotation of the ball, the two level flight horizon indications for normal and inverted flight respectively. For aiding the pilot in judging the bank attitude, the scale 5 is provided with a fixed index mark 43 at top center on which the index portion 41' can be centered.

The operation of the simulated attitude gyro apparatus will now be described in connection with a typical airobatic maneuver, such as a complete inside loop as diagrammatically illustrated in Fig. 5. The various positions of the aircraft in the loop are represented by correspondingly designated instrument indications in Fig. 6.

Figure 4:
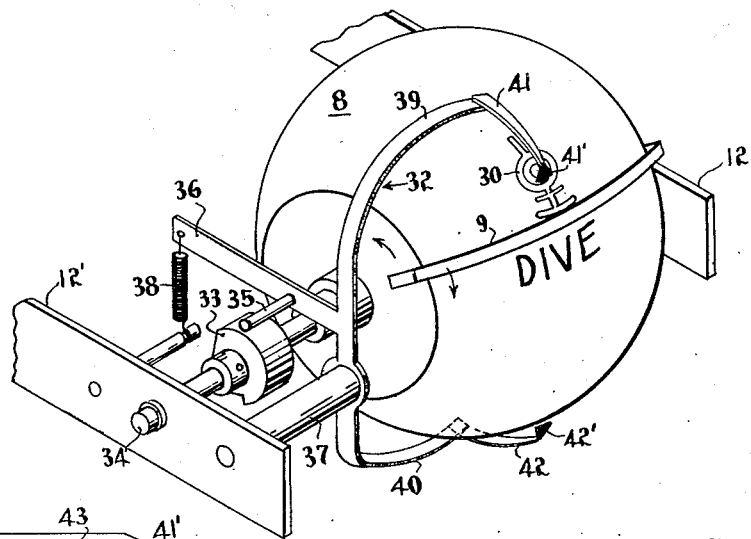
Fig. 4 is an expanded detail perspective view of the bank index indicator and associated operating means including the ball in a dive-indicating position.
Figure 5:
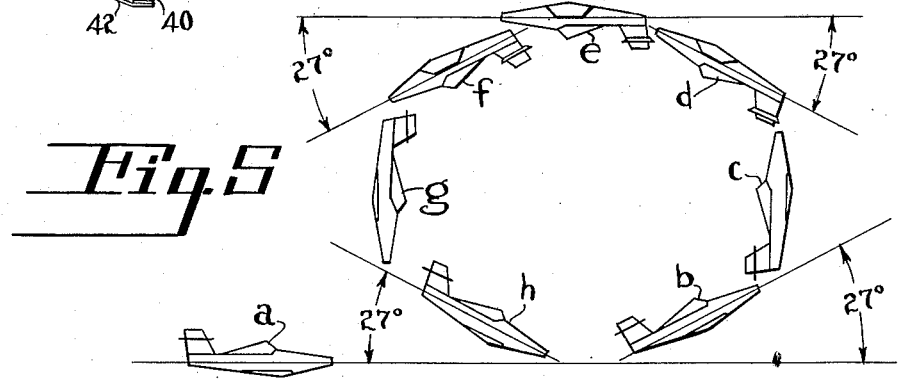
Figs. 5 and 6 are diagrams illustrating the instrument indications at various points along an inside loop.
Figure 6:
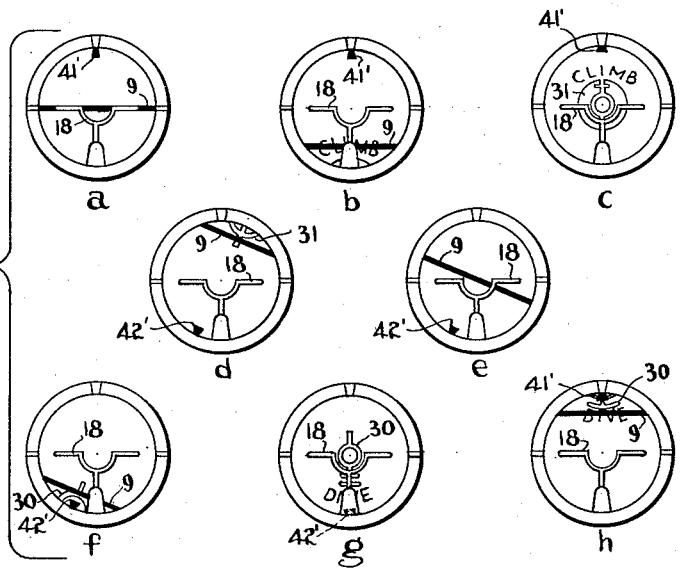

Assuming now that the aircraft is in normal level flight at position a, Fig. 5, the corresponding instrument indication is shown by Fig. 6-a wherein the horizon bar 9 is centered (assuming level trim) and the index portion 41' is visible at the top of the dial. For this attitude the pin 35, Fig. 4, rides on the high part of the cam at its midportion. During such flight a roll or bank attitude, for example a right bank is represented by movement of the bank index 41' to the left along the top of the dial with corresponding tilting to the left of the horizon bar 9 in accordance with rotation of the yoke 2 by the roll servo. A left bank is represented by tilting of the horizon bar and movement of the index 41' toward the right so as to represent the horizon as it would appear in actual flight, and a nose-up or climb position results in the horizon bar being lowered by the pitch receiver 6. The opposite is true for a nose-down or dive position.

As the aircraft proceeds from position a to position b for the inside loop maneuver, the pilot pulls back the stick for climbing and at position b (at which the longitudinal axis of the aircraft is inclined approximately 27° from the horizontal) the horizon bar as shown at Fig. 6-b is about to disappear at the lower part of the dial. The index portion 41' remains in full view at the top of the dial as the pin 35, Fig. 4, is still on the high part of the cam. The ball 8 which is being rotated in the opposite direction now brings into partial view the climb indicia 31 at the bottom of the dial. As the climb continues, the aircraft reaches point c whereat the nose is pointed toward the zenith in a vertical climb. At this point the instrument, Fig. 6–c, shows the climb indicia 31 on the ball as centered on the instrument dial. The index portion 41' is now on the verge of disappearing since the pin 35, Fig. 4, is moving to the low part of the cam for rocking the index member 32 upward.

At point d the plane has reached an inverted position and is approaching the top of the loop as represented by Fig. 6–d. In this position the aircraft longitudinal axis is again inclined approximately 27° from the horizontal. The horizon bar has now passed around the rear side of the ball and appears again at the top of the dial as the climb indicia 31 begins to disappear at the top. It should now be noted that the index portion 41' has disappeared at the top of the dial and the index portion 42' has appeared at the bottom of the dial representing inverted flight. The aircraft is here represented in a slight roll in order to illustrate the operation of the portion 42'.

At position e the aircraft is in inverted flight at the top of the loop and the horizon bar 9 is centered as in Fig. 6–a. However, it will be noted that the index portion 42' is visible at the bottom of the dial (for a roll attitude) and that no indication appears at the top of the dial, thus informing the pilot that he is in inverted flight. It will be noted in comparing Figs. 6–a and 6–e that the horizon bar has made a complete revolution around the ball while the ball has rotated 180°.

At position f, the aircraft is represented as approximately 27° from the horizontal at the descending side of the loop and still in inverted position. As represented at Fig. 6–f, the horizon bar is again about to disappear and the dive indicia 30 on the ball is beginning to appear at the bottom of the dial. The index portion 42' still represents inverted position.

At position g the aircraft is nose-down in vertical dive. As shown by Fig. 6–g, the dive indicia on the ball is now centered and the index portion 42' is about to disappear. The horizon bar, of course, is not visible since it is at the opposite side of the ball. The plane has again reached normal position at point h and is represented at approximately 27° from the horizontal in a dive. Fig. 6–h represents this as the opposite of position d, that is, the horizon bar is now appearing at the top of the dial while the dive indicia is disappearing and the index portion 41' has now reappeared while at the bottom of the dial the index portion 42' has disappeared. This position of the apparatus is generally shown in Fig. 4. From this point the aircraft levels off to the position represented by Fig. 6–a as the horizon bar is lowered to its centered position and the dive indicia disappears at the top.

Accordingly, it is seen that the apparatus of this invention is capable of adequately simulating for practical purposes the visual indications of actual attitude gyro apparatus, type A–1 in particular, without excessive complication and without sacrificing compactness in design.

The term "indicia" as used herein is intended to comprehend any suitable marking used on the ball for flight indication and not to be limited to the climb and dive markings illustrated.

It should be understood that this invention is not limited to specific details of construction and arrangement thereof herein illustrated, and that changes and modifications may occur to one skilled in the art without departing from the spirit of the invention.

What is claimed is:

1. Simulated attitude gyro apparatus for a grounded aircraft trainer comprising a supporting frame mounted for rotation according to simulated roll, a ball having flight indicia carried by and rotatable on said frame, means also mounted on said frame arranged to be positioned according to simulated pitch, mechanical means interconnecting said ball and pitch means for positioning said ball according to pitch, a horizon bar rotatably mounted with respect to said frame and movable over the outer surface of said ball, mechanical means also interconnecting said pitch means and said bar for rotating said bar in the opposite direction of said ball rotation, and bank index means also mounted with respect to said frame and mechanically related to said pitch means for movement between positions representing respectively normal and inverted flight.

2. Simulated attitude gyro apparatus for a grounded aircraft trainer comprising a supporting frame mounted for rotation according to simulated roll, a fixed dial, a ball having flight indicia carried by and rotatable on said frame with respect to said dial according to simulated pitch, a horizon bar rotatably mounted with respect to said frame and movable over the outer surface of said ball, means interconnecting said ball and said bar for causing rotation of said bar in the opposite direction and at greater angular speed than said ball, and a bank index member also mounted with respect to said frame and mechanically related to said ball for indicating normal and inverted flight.

3. Simulated attitude gyro apparatus for a grounded aircraft trainer comprising a supporting frame mounted for rotation according to simulated roll, a fixed dial, a ball having flight indicia carried by and rotatable on said frame with respect to said dial, means also mounted on said frame arranged to be positioned according to simulated pitch, mechanical means interconnecting said ball and pitch means for positioning said ball according to pitch, a horizon bar rotatably mounted on said frame and movable over the outer surface of said ball, mechanical means also interconnecting said pitch means and said bar for rotating said bar in the opposite direction and at greater angular speed than said ball, and a bank index member having a pair of indicating portions also mounted on said frame and mechanically related to said pitch means for alternately moving said portions into view on said dial for representing respectively normal and inverted flight.

4. Simulated attitude gyro apparatus for a grounded aircraft trainer comprising a supporting frame mounted for rotation according to simulated roll, a ball having flight indicia and mounted for continuous rotation in either direction on said frame, a servo element mounted on said frame arranged to be positioned according to simulated pitch, mechanical means interconnecting said ball and servo element for positioning said ball according to pitch, a horizon bar rotatably mounted on said frame and movable over and completely around the outer surface of said ball, mechanical means also interconnecting said servo element and said bar for rotating said bar in the opposite direction and at greater angular speed than said ball, and bank index means also mounted on said frame and mechanically related to said servo element for movement between positions representing respectively normal and inverted flight.

5. Simulated attitude gyro apparatus for a grounded aircraft trainer comprising a housing, a dial window and fixed scale at one end of said housing, a yoke having a supporting shaft journaled in the opposite end of said housing, said shaft being rotatable so as to position said yoke according to simulated roll, a ball adjacent to said window having "climb" and "dive" indicia respectively on its surface spaced substantially 180° apart, said ball being mounted for rotation between the arms of said yoke, a servo element mounted on said yoke adapted to be positioned according to simulated pitch, a gear train interconnecting said servo element and ball for positioning said ball according to pitch, a horizon bar rotatably mounted on said yoke for movement across the surface of said ball, said horizon bar being connected to said gear train so as to rotate in the opposite direction and at twice the speed of said ball, a bank index member rotatably mounted on said yoke and having a pair of indicator arms but one of which is visible at a time in the dial window, and a cam connection between said ball and said index member for rocking said indicator arms between positions representing respectively normal and inverted flight.

6. Simulated attitude gyro apparatus for a grounded aircraft trainer comprising a housing, a dial window and fixed scale at one end of said housing, a frame having a supporting shaft journaled in the opposite end of said housing, said shaft being rotatable so as to position said frame according to simulated roll, a ball adjacent to said window having "climb" and "dive" indicia respectively on its surface spaced substantially 180° apart, said ball being mounted for continuous rotation in either direction on said frame, a servo element mounted on said frame adapted to be positioned according to simulated pitch, a gear train interconnecting said servo element and ball for positioning said ball according to pitch, a horizon bar rotatably mounted on said frame for continuous movement in either direction across the surface of said ball, said horizon bar being connected to said gear train so as to rotate in the opposite direction and at twice the speed of said ball, a bank index member rotatably mounted on said frame and having a pair of indicator arms but one of which is visible at a time in the dial window, and means connecting said ball and said index member for rocking said indicator arms between positions representing respectively normal and inverted flight.

7. Simulated attitude gyro apparatus for a grounded aircraft trainer comprising a housing, a dial window and fixed scale at one end of said housing, a frame having a supporting shaft journaled in the opposite end of said housing, said shaft being rotatable so as to position said frame according to simulated roll, a ball adjacent to said window having "climb" and "dive" indicia respectively on its surface spaced substantially 180° apart, said ball being mounted for rotation on said frame, a servo element mounted on said frame adapted to be positioned according to simulated pitch, a gear train interconnecting said servo element and ball for positioning said ball according to pitch, a horizon bar rotatably mounted on said frame concentrically of said ball for movement across the surface of said ball, said horizon bar being connected to said gear train so as to rotate in the opposite direction and at twice the speed of said ball, a bank index member rotatably mounted on said frame and having a pair of arcuate indicator arms extending over the surface of said ball at right angles to said horizon bar, but one of said indicator arms being visible at a time in the dial window at the upper or lower part thereof, and a connection between said ball and said index member for rocking said indicator arms between exposed and hidden positions representing respectively either normal or inverted flight.

8. Simulated attitude gyro apparatus for a grounded aircraft trainer comprising a supporting frame mounted for rotation according to simulated roll, a ball having flight indicia carried by and rotatable on said frame, means also mounted on said frame arranged to be positioned according to simulated pitch, mechanical means interconnecting said ball and pitch means for positioning said ball according to pitch, a horizon bar rotatably mounted on said frame and movable over the outer surface of said ball, mechanical means also interconnecting said pitch means and said bar for rotating said bar in the opposite direction and at twice the speed of said ball, and bank index means also mounted on said frame and mechanically related to said pitch means for movement between positions representing respectively normal and inverted flight.

9. Simulated attitude gyro apparatus for a grounded aircraft trainer comprising a supporting frame mounted for rotation according to simulated roll, a fixed dial, a ball having flight indicia carried by and rotatable on said frame with respect to said dial according to simulated pitch, a horizon bar rotatably mounted on said frame and movable over the outer surface of said ball, means interconnecting said ball and said bar for causing rotation of said bar in the opposite direction and at twice the speed of said ball, and a bank index member also mounted on said frame and mechanically related to said ball for indicating alternate positions at opposite sides of said dial representing respectively normal and inverted flight.

RICHARD CARL DEHMEL.

No references cited.